(12) United States Patent
Yamada

(10) Patent No.: US 11,987,450 B2
(45) Date of Patent: May 21, 2024

(54) INFORMATION PROCESSING DEVICE

(71) Applicant: LoPAS CO. LTD., Tokyo (JP)

(72) Inventor: Tokuhiro Yamada, Tokyo (JP)

(73) Assignee: LoPAS CO., LTD., Tokyo (JP)

( * ) Notice: Subject to any disclaimer, the term of this patent is extended or adjusted under 35 U.S.C. 154(b) by 28 days.

(21) Appl. No.: 17/748,736

(22) Filed: May 19, 2022

(65) Prior Publication Data

US 2022/0380135 A1 Dec. 1, 2022

(30) Foreign Application Priority Data

May 25, 2021 (JP) ................. 2021-087766

(51) Int. Cl.
*B65G 43/08* (2006.01)
*B65G 43/06* (2006.01)

(52) U.S. Cl.
CPC ............ *B65G 43/08* (2013.01); *B65G 43/06* (2013.01)

(58) Field of Classification Search
CPC ................. B65G 43/08; B65G 43/06
USPC ........................................ 198/358
See application file for complete search history.

(56) References Cited

U.S. PATENT DOCUMENTS

| 10,889,449 B2* | 1/2021 | Umeyama | B65G 43/08 |
| 2019/0092578 A1* | 3/2019 | Umeyama | B60L 13/03 |
| 2022/0144557 A1* | 5/2022 | Kobayashi | H01L 21/67294 |
| 2023/0060472 A1* | 3/2023 | Fujieda | B25J 9/1671 |

FOREIGN PATENT DOCUMENTS

| JP | 2020-142928 A | 9/2020 | |
| KR | 101975398 B1 * | 5/2019 | B65G 43/02 |

OTHER PUBLICATIONS

Willis, EP 3699872 (Year: 2020).*

* cited by examiner

*Primary Examiner* — Gene O Crawford
*Assistant Examiner* — Lester Ill Rushin
(74) *Attorney, Agent, or Firm* — Fitch, Even, Tabin & Flannery, LLP

(57) ABSTRACT

An information processing device includes a communication unit configured to acquire drawing data in which a plurality of reference positions is set on a transportation path constituted of a transportation device and measured data which is obtained as a result of transportation on the transportation path and which includes a shape of the transportation path. The information processing device further includes a processing unit configured to detect reference positions in the measured data, superimpose the reference positions in the drawing data and the reference positions in the measured data corresponding to the reference positions in the drawing data onto each other, and correct a path between the reference positions in the measured data.

2 Claims, 11 Drawing Sheets

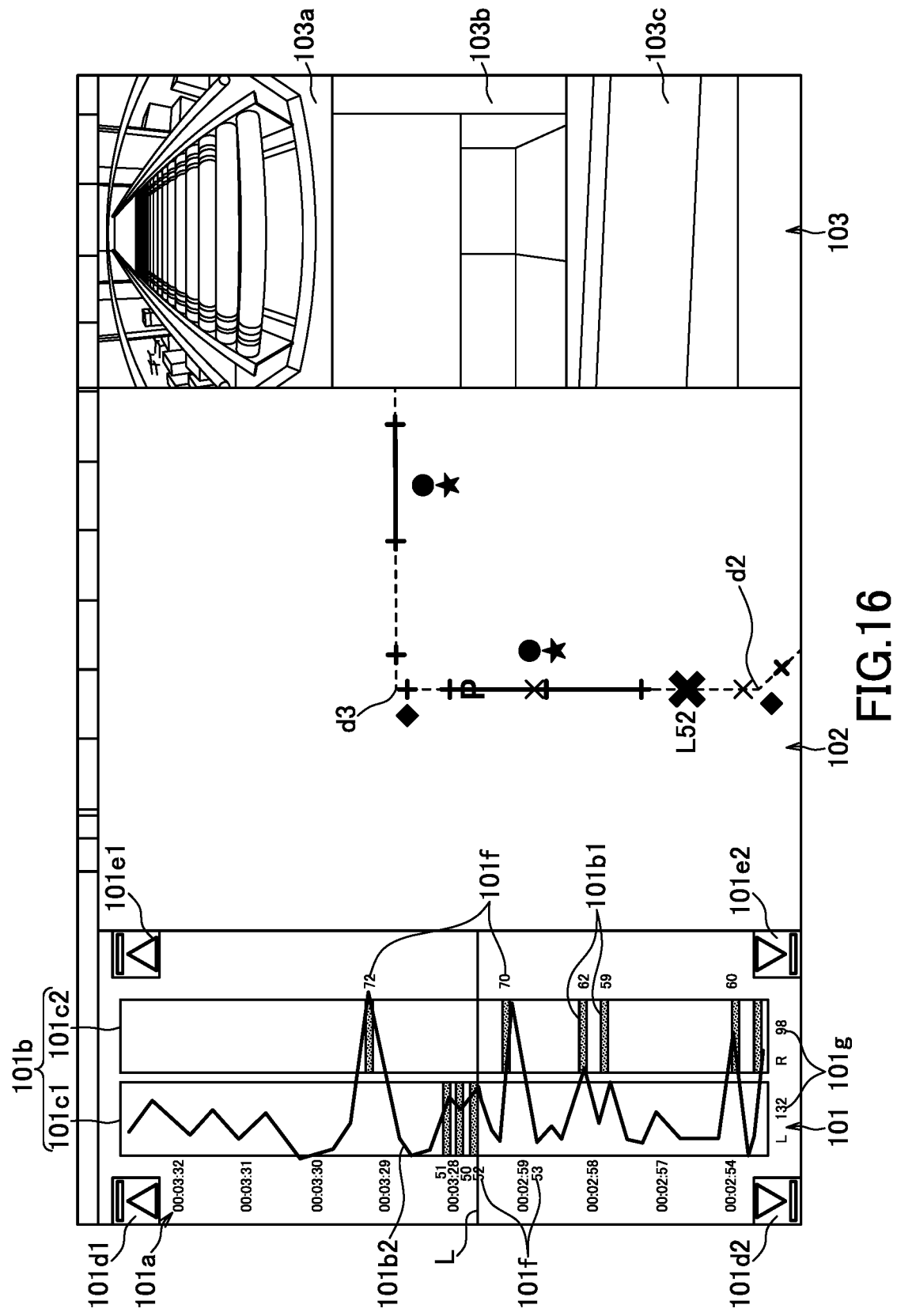

INFORMATION PROCESSING DEVICE

CROSS-REFERENCE TO RELATED APPLICATIONS

This application claims priority to Japanese Patent Application No. 2021-087766, filed May 25, 2021.

TECHNICAL FIELD

The present invention relates to an information processing device configured to correct data collected for a transportation device installed for example in a warehouse or the like.

BACKGROUND

Conventionally, a conveyor device is often used as a transportation device in a warehouse for receiving and sending things into and out of the warehouse. In this type of conveyor device, a detecting unit such as a sensor is fixedly mounted around a component of the conveyor device or around the conveyor device to perform fault detection.

In the case where the detecting unit such as a sensor is fixedly mounted, there is a problem that a detection range is limited. In view of this, an abnormality detection system as disclosed in Patent Document 1 has been proposed by the applicant, in which a container as an object to be transported including a camera, a sensor module, etc. is transported on a conveyor device, thereby enabling to detect abnormality in the entire transportation path at a low cost.

RELATED ART DOCUMENT

Patent Document 1: JP 2020-142928 A

SUMMARY OF THE INVENTION

Problem to be Solved by the Invention

In the system disclosed in Patent Document 1, accumulated information collected by the system is analyzed by a computer and such, so that a location of the detection of the abnormality in the transportation path and such can be displayed on a terminal device or the like of an operator.

However, there is a problem that in some cases it is difficult to install a guide such as a guide pole as described in Patent Document 1 and/or that a method of counting the number of rollers as described in Patent Document 1 cannot be applied to a belt conveyor.

In the case where the guide is not used, the abnormal location may be determined by generating a transportation path (also referred to as layout information or map information) based on images captured by a camera to determine the abnormal location based on the transportation path. In this method, accuracy of recognition of the path may decrease due to the effect of image blur caused by vibration or the like generated during transportation of the container, and this may cause a deviation from the actual layout, and so it is not always possible to determine the abnormal location with high accuracy.

The present invention is intended to solve the problems as described above and aims to improve accuracy of determination of an abnormal location.

Solution to the Problem

The present invention provides, in a first aspect, an information processing device including a first acquiring unit configured to acquire drawing data in which a plurality of reference positions is set on a transportation path constituted of a transportation device, a second acquiring unit configured to acquire measured data obtained as a result of transportation on the transportation path, the measured data including a shape of the transportation path, a detecting unit configured to detect the reference positions in the measured data, and a correcting unit configured to superimpose the reference positions in the drawing data and the reference positions in the measured data that correspond to the reference positions in the drawing data onto each other, and correct a path between the reference positions in the measured data.

Advantageous Effect of the Invention

As described above, according to the present invention, the reference positions in the drawing data and the reference positions in the measured data that correspond to the reference positions in the drawing data are superimposed onto each other to correct a path between the reference positions in the measured data. Consequently, it is possible to make a correction when there is a deviation between the drawing data which is the actual layout and the measured data, thereby improving accuracy of determination of an abnormal location.

BRIEF DESCRIPTION OF THE DRAWING

FIG. 16 is a modified example of the display example of FIG. 12.

DETAILED DESCRIPTION OF THE EXEMPLARY EMBODIMENT

Figure 1:
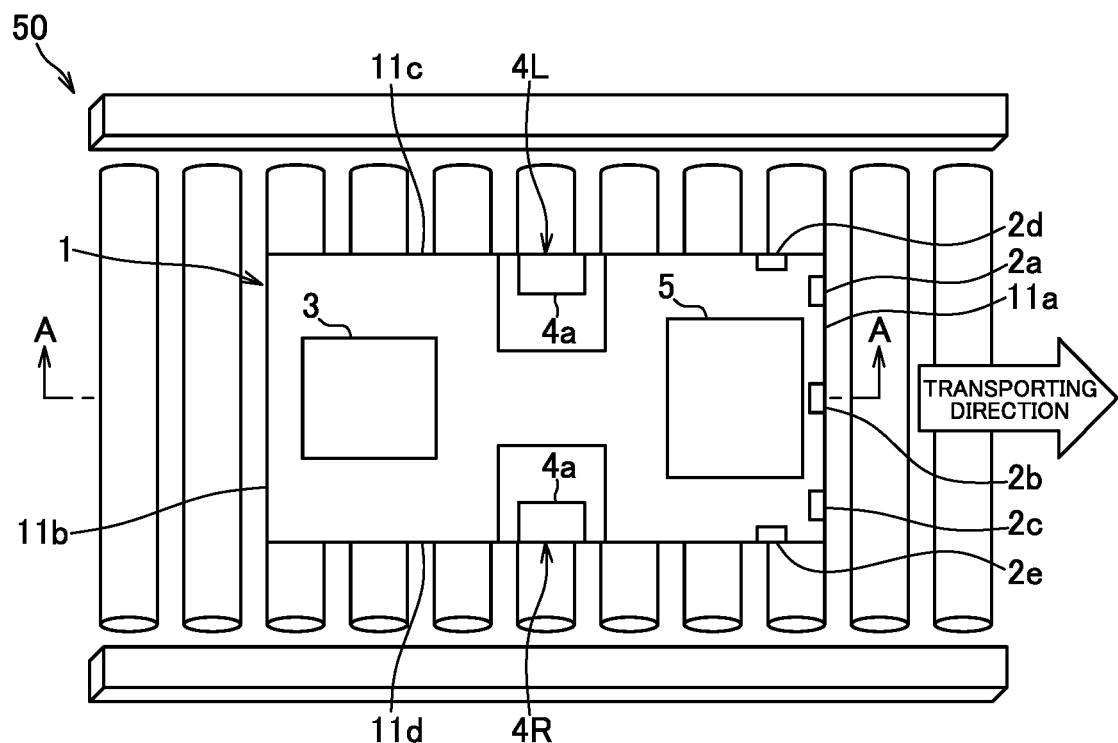
FIG. 1 is a top view of a container configured to collect data to be processed by an information processing device according to one embodiment of the present invention.
Figure 2:
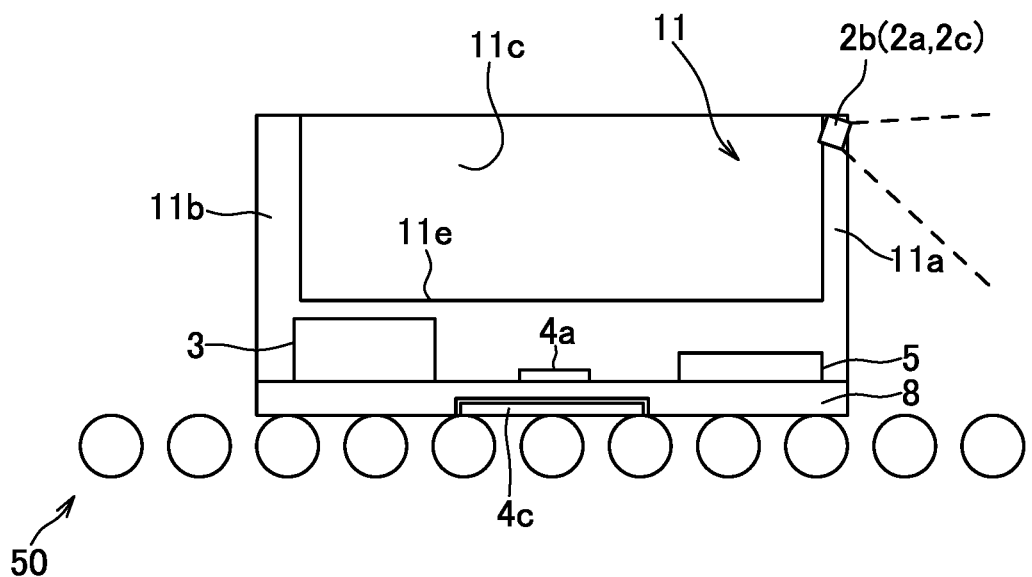
FIG. 2 is a cross-sectional view taken along line A-A of the container shown in FIG. 1.

An information processing device and an information display device according to one embodiment of the present invention will be described with reference to FIG. 1 to FIG. 16. FIG. 1 is a top view of a container configured to collect data to be processed by an information processing device according to one embodiment of the present invention. FIG. 2 is a cross-sectional view taken along line A-A of the container shown in FIG. 1.

A container 1 is configured to be placed on a conveyor device 50 as a transportation device and transported by the conveyor device 50. In FIG. 1, it is transported in a direction of an arrow. Although FIG. 1 and FIG. 2 show a roller conveyor as the transportation device, other transportation devices such as a belt conveyor are also possible. Further, although only a part of the conveyor device 50 is shown in FIG. 1 and FIG. 2, the conveyor device 50 is installed in a warehouse or the like and includes a transportation path constituted of a straight line, a curved line and/or an inclined path, for example. Thus, the conveyor device 50 may be constituted of a plurality of conveyor devices.

The container 1 shown in FIG. 1 and FIG. 2 is formed in a substantially rectangular parallelepiped box shape to constitute a housing portion 11. The housing portion 11 includes an opening formed on an upper part thereof to allow putting in and taking out goods and such. Further, the housing portion 11 includes four side portions 11a, 11b, 11c, 11d and a bottom portion 11e.

As shown in FIG. 1 and FIG. 2, the side portions 11a, 11b are side faces along a short-side direction of the rectangular parallelepiped, and the side portions 11c, 11d are side faces along a long-side direction of the rectangular parallelepiped. In this embodiment, the side portion 11a is on the front side, thus it is facing a transporting direction (i.e., a traveling direction). Thus, the side portion 11b is on the rear side, the side portion 11c is on the left side toward the traveling direction, and the side portion 11d is on the right side toward the traveling direction.

The container 1 includes a camera 2, a controller 3, sensor modules 4L, 4R and a battery 5.

The camera 2 is, for example, a camera module including an imaging element such as a CCD (Charge Coupled Device) image sensor or a CMOS (Complementary Metal Oxide Semiconductor) image sensor.

The camera 2 is constituted of cameras 2a, 2b, 2c, 2d, 2e. The cameras 2a to 2c are provided at the side portion 11a to capture an image in front of the container 1. The cameras 2a to 2c are provided to capture an image mainly on the lower side in front of the container 1 (see FIG. 2). The camera 2d is provided at the side portion 11c. The camera 2e is provided at the side portion 11d.

The camera 2a captures an image on the front left side with respect to the transporting direction of the container 1. The camera 2b captures an image on the front middle side with respect to the transporting direction of the container 1. The camera 2c captures an image on the front right side with respect to the transporting direction of the container 1. The camera 2d captures an image on the left side with respect to the transporting direction of the container 1. The camera 2e captures an image on the right side with respect to the transporting direction of the container 1. The cameras 2a and 2c are known thermal cameras (i.e., infrared thermographic cameras). The cameras 2b, 2d, 2e are wide-angle cameras.

In this embodiment, the cameras 2a, 2c can detect temperature of the conveyor device 50 in the transporting direction. That is, the cameras 2a, 2c function as a condition detecting unit that detects a condition in the front direction with respect to the traveling direction of the transportation device. Further, the camera 2b may be a stereo camera.

The controller 3 is provided at a place further below the bottom portion 11e. In other words, the container 1 has a double bottom. The controller 3 is directly or indirectly mounted on a vibration absorbing member 8 which absorbs vibration such as a vibration absorbing mat. The vibration absorbing member 8 can make the controller 3 and such to be less susceptible to the effect of the vibration generated due to the transportation.

The controller 3 estimates a current position (own-position) of the container 1 based on the images captured by the camera 2. In addition, the controller 3 learns the results detected by the sensor modules 4L, 4R through deep learning, and, based on the results of the learning, determines the presence or absence of abnormality by determining whether the result detected by the sensor modules 4L, 4R is within a normal range. Details will be described later.

The sensor module 4L includes a sound sensor 4a and a vibration sensor 4c. The sensor module 4L is disposed on the side portion 11c side. Further, the sound sensor 4a is directly or indirectly mounted on the vibration absorbing member 8, and the vibration sensor 4c is directly mounted on a bottom face of the container 1 below the vibration absorbing member 8.

The sensor module 4R has the configuration basically the same as the sensor module 4L. The sensor module 4R differs from the sensor module 4L in that it is disposed on the side portion 11d side. That is, the sensor module 4L detects a condition on the left side toward the traveling direction of the container 1, and the sensor module 4R detects a condition on the right side toward the traveling direction of the container 1.

The sound sensor 4a collects external sound to detect sound emitted by a predefined conveyor device 50. The sound sensor 4a may be constituted of a unidirectional microphone and a frequency filter and such, for example. The vibration sensor 4c detects vibration applied to the container 1. The vibration sensor 4c may be constituted of an acceleration sensor or the like. The acceleration sensor is preferably 3-axis acceleration sensor, or alternatively it may be 1-axis or 2-axis acceleration sensor. Further, the vibration sensor 4c may not be provided for each of the sensor modules, it may be provided one per container 1. Although two types of sensors are used in this embodiment, other sensors such as an optical sensor or a magnetic sensor may be used as well. That is, the sensor modules 4L, 4R function as a condition detecting unit configured to detect a condition of the conveyor device 50.

The battery 5 is directly or indirectly mounted on the vibration absorbing member 8. The battery 5 supplies power to the camera 2, the controller 3 and the sensor modules 4L, 4R described above. Further, the container 1 includes a terminal (not shown) for charging the battery 5. Alternatively, the battery 5 may be detachable for charging.

Figure 3:
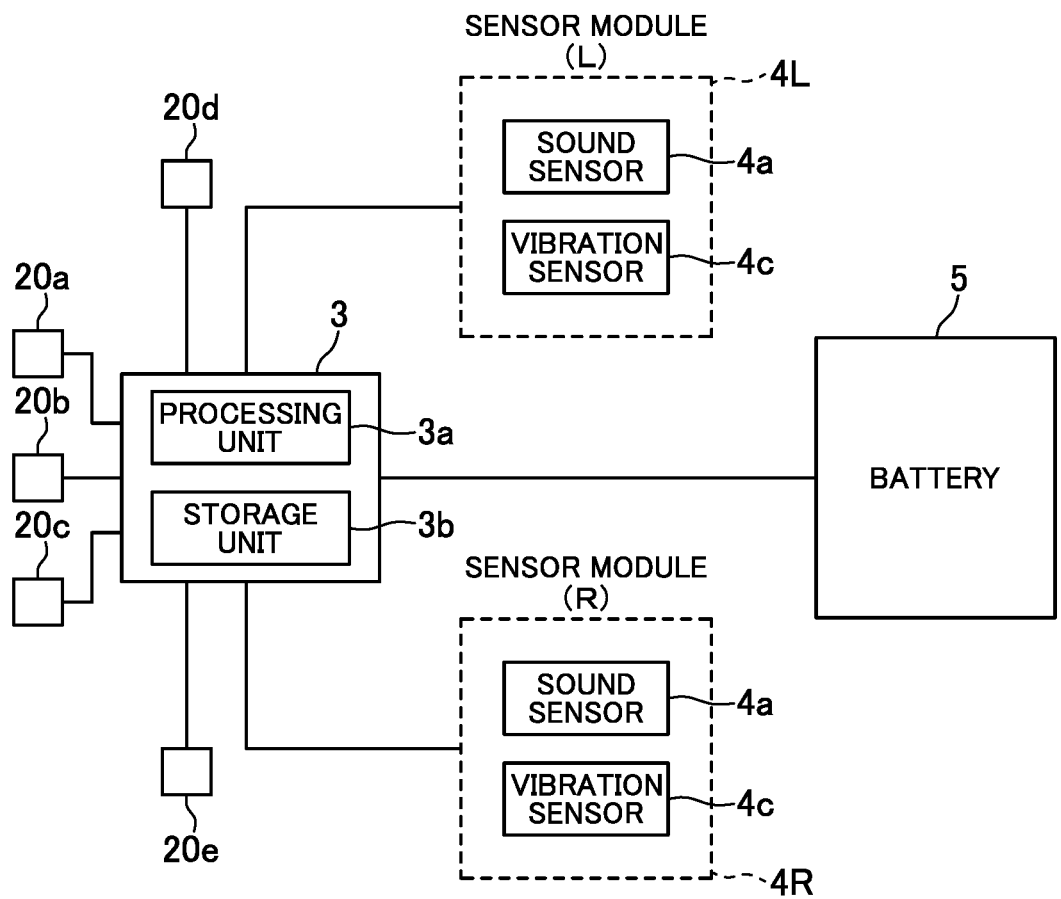
FIG. 3 is a block diagram of the container shown in FIG. 1.

FIG. 3 shows a block diagram of the container (abnormality detection system) 1 according to this embodiment. As shown in FIG. 3, the controller 3 includes a processing unit 3a and a storage unit 3b.

The processing unit 3a is constituted of, for example, a microprocessor and the like, and is configured to perform acquisition of the detected values of the various sensors, own-position estimation, deep learning, and determination of the presence or absence of abnormality, etc. That is, the processing unit 3a together with the camera 2 functions as a current position detecting unit.

The storage unit 3b is constituted of, for example, a storage device such as an SSD (Solid State Drive), wherein the detection results of the sensor modules 4L, 4R are associated with the position information obtained by the own-position estimation and accumulated and stored in the storage unit 3b. Further, layout (map) information of the transportation path for the own-position estimation is also stored in the storage unit 3b.

Figure 4:
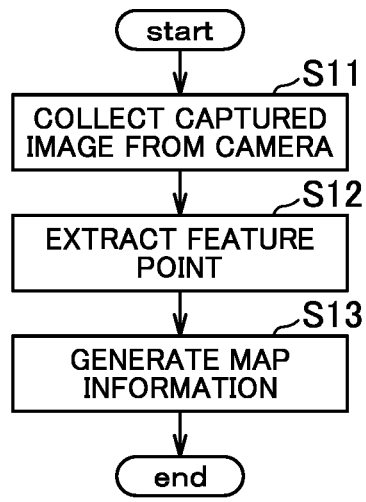
FIG. 4 is a flowchart of a map information generation process based on data collected by the container shown in FIG. 1.

Next, an operation of the container 1 having the above-described configuration will be described with reference to flowcharts of FIG. 4 to FIG. 6. FIG. 4 is a flowchart for generating map information for performing the own-position estimation based on images captured by the camera 2.

First, captured images are collected from the camera 2b (step S11), and the processing unit 3a extracts feature points from the collected captured images (step S12). Then, based on the extracted feature points, the processing unit 3a generates a three-dimensional map (map information) for the transportation path formed by the conveyor device 50 (step S13). This three-dimensional map is obtained by joining the feature points extracted respectively from the plurality of images captured when the camera 2b is transported by the conveyor device 50, thus it is information that contains the feature points on the transportation path.

However, the map information may not be a three-dimensional map. For example, it may be two-dimensional information of a path constituted of straight lines, curves, etc. (see, for example, FIG. 8). In this case, the curve may be detected as the feature point.

Figure 5:
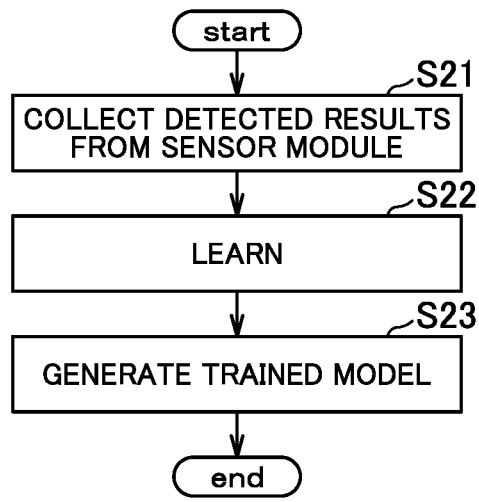
FIG. 5 is a flowchart of a trained model generation process based on data collected by the container shown in FIG. 1.

FIG. 5 is a flowchart for generating a trained model using deep learning based on the detection results detected by the sensor modules 4L, 4R and the cameras 2a, 2c which are thermal cameras.

First, the detection results detected by the sensor modules 4L, 4R and the cameras 2a, 2c are collected (step S21), and the processing unit 3a learns the normal detection results for the respective sensors through known deep learning (step S22). That is, it learns the detection results of the sensors in a condition where the conveyor device 50 is normally operating. Herein, the normal condition may have a certain range in value. Further, in this step, the processing unit learns the normal condition (detection results) for each position on the conveyor device 50. This is because the normal sound, temperature and vibration have ranges which often vary depending on the position on the conveyor device 50. Thus, the processing unit learns by referring to the three-dimensional map information to associate the detection results with the position. Then, the processing unit 3a generates a trained model which is trained with a predetermined amount of detection results (step S23).

Figure 6:
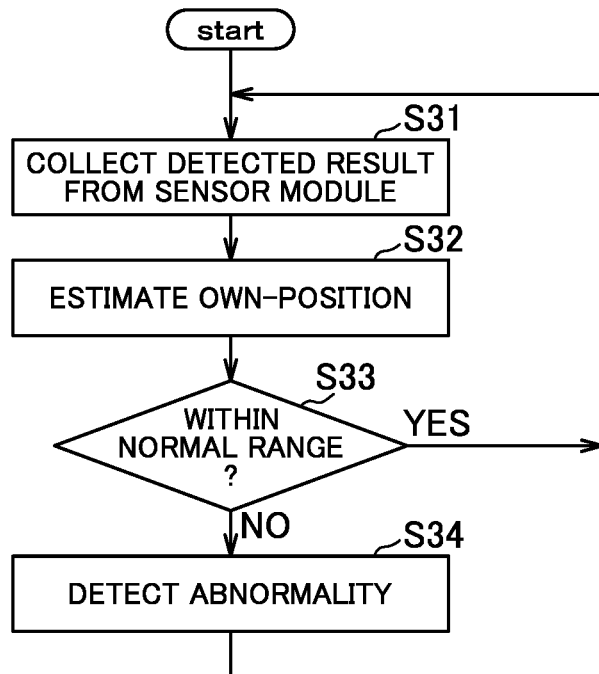
FIG. 6 is a flowchart of an abnormality detection process based on data collected by the container shown in FIG. 1.

FIG. 6 is a flowchart for detecting abnormality using the map information generated by the flowchart of FIG. 4 and the trained model generated by the flowchart of FIG. 5.

First, the detection results detected by the sensor modules 4L, 4R and the cameras 2a, 2c are collected (step S31), and the processing unit 3a estimates the own-position of the container 1 based on the image captured by the camera 2b and the map information stored in the storage unit 3b (step S32). Then, the processing unit 3a determines whether the detection result collected in step S31 is within the normal range using the trained model for the own-position estimated in step S32 (step S33), and if the detection result is out of the normal range (step S33: NO), then it notifies the abnormality detection using, for example, a notifying device or the like not shown and stores in the storage unit 3b position information about the position where the abnormality is detected (step S34). On the other hand, if the detection result is within the normal range (step S33: YES), then the process returns to step S31.

Herein, the determination in step S33 is performed for each sensor. That is, for each sensor it is determined whether the detection result is within the normal range or not, and when the detection results of all the sensors are within the normal ranges, it is determined to be normal. Thus, when the detection result of one of the sensors is out of the normal range, it is determined to be abnormal.

In this manner, it is possible to read signs of failures for example as those described below. However, the determination of details of the failures as described below does not need to be performed by the container 1, as long as it is detected that some kind of abnormality exists at that position. The determination of details of the failure may be performed by another measuring device or by an operator's check or the like.

For example, the detection result of the sound sensor 4a allows to detect breakage of a roller or a shaft of the conveyor device 50, failure in transmission of a drive force to a carrier roller, and/or idle rotation of a roller, etc. Further, the detection result of the vibration sensor 4c allows to detect breakage of a roller or a shaft of the conveyor device 50, an inclined roller surface, failure in transmission of a drive force to a carrier roller, and/or idle rotation of a roller, etc. The detection results of the cameras 2a, 2c allow to detect abnormal heat generation at the power supply of the conveyor device 50, etc.

Further, it is possible to detect failure and such in the power supply of the conveyor device 50 by combining the detection result of the sound sensor 4a and the detection result of the vibration sensor 4c. Further, it is possible to detect failure and such in a motor of the conveyor device 50 by combining the determination result of the sound sensor 4a, the detection results of the cameras 2a, 2c and the detection result of the vibration sensor 4c.

For example, using the detection result of the sound sensor 4a alone, it is possible to detect any one of breakage of a roller or a shaft of the conveyor device 50, failure in transmission of a drive force to a carrier roller, or idle rotation of a roller, and, by associating the detection result with the position information obtained by the own-position estimation, it is possible to determine where the sign of this failure was observed.

Using the method described above, it is possible to determine the abnormal location by the controller 3 of the container 1. However, for example when the transportation path is displayed as a map and the abnormal location is displayed on this map, there may be a deviation between the transportation path (map information) created from the information collected by the container 1 and the layout of the actual transportation path due to a decrease in accuracy of recognition of the path caused by the effect of an image blur resulting from the vibration and such during the container transportation. Thus, in this embodiment, the map information (measured data) which is created from the data collected by the container 1 is corrected using a drawing (drawing data) of the transportation path which is prepared in advance, thereby allowing to display the map matched to the actual transportation path. In the following, the measured data is intended for the two-dimensional map information described above.

Figure 7:
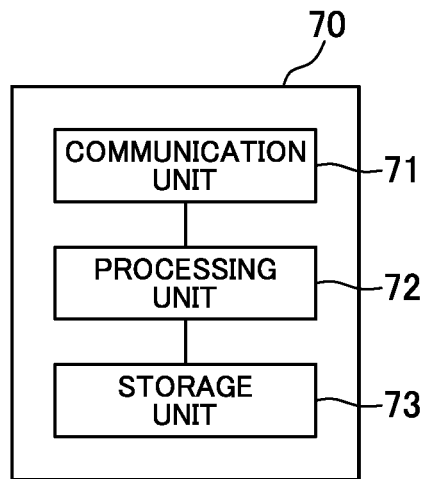
FIG. 7 is a block diagram of a computer as the information processing device according to one embodiment of the present invention.

FIG. 7 shows a functional configuration of a computer 70 as the information processing device configured to perform the above-described correction processing. The computer 70 may be installed in the vicinity of the conveyor device 50, or may be installed in, for example, a room separate from the transportation device. The computer 70 may be constituted of a server computer or a personal computer and may be of a desktop type, notebook type, tablet type, or the like.

The computer 70 includes a communication unit 71, a processing unit 72 and a storage unit 73. The communication unit 71 performs wireless communication via a communication technology such as Wi-Fi (registered trademark). The communication unit 71 receives the abnormal location and the measured data and such collected by the container 1. In this case, the container 1 also has a communication function. Further, although the abnormality information (i.e., abnormal location, details of abnormality, etc.) and the measured data are received via a wireless communication in FIG. 7, they may be acquired after the transportation via a wired connection, for example using USB (Universal Serial Bus), LAN (Local Access Network), etc., or may be acquired via a storage medium such as a memory card.

The processing unit 72 is constituted of a microprocessor or the like and is configured to perform the correction processing on the measured data described above and the like. The storage unit 73 is constituted of, for example, a storage device such as an SSD, and is configured to store various data received by the communication unit 71.

In this embodiment, first, drawing data indicating the transportation path is prepared in advance. This drawing data is not based on the measured data, but is created from design data, etc. used when constructing the transportation path. Thus, in the drawing data, an angle of a curve and a length of a straight line, etc. described later accurately follow those of the actual transportation path.

Figure 8:
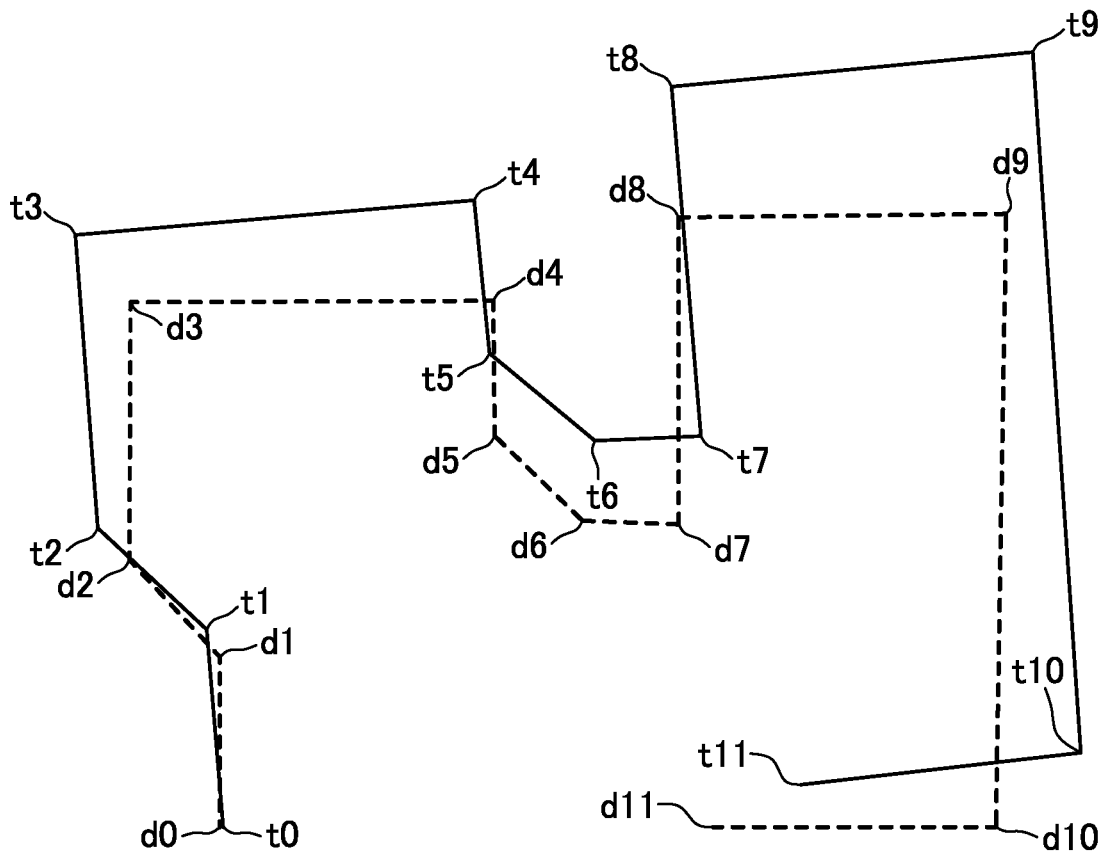
FIG. 8 is a diagram illustrating the case where a deviation has occurred between drawing data and measured data.

FIG. 8 shows a diagram illustrating the case where there is a deviation between the drawing data and the measured data. In FIG. 8, the solid line indicates the measured data (hereinafter, also referred to as "tracking data"), and the dotted line indicates the drawing data. That is, the measured data also includes information of the shape of the transportation path. The reference signs t1 through t10 indicate the curve positions on the path in the tracking data, and the reference signs d1 through d10 indicate the curve positions on the path in the drawing data. The reference signs t0 and d0 indicate a start point of the path, and the reference signs t11 and d11 indicate an end point of the path.

In the drawing data, the curve position is registered as a reference position (herein, it may be registered by manually detecting/setting). The curve is defined as a connection between one straight line and another straight line extending in a direction different from said one straight line. For example, the curve position may be a vertex position of the curve, or alternatively, it may be a start point or an end point of the curve. On the other hand, in the tracking data, the curve can be detected by detecting straight lines from the camera image using image recognition or the like. The curve position detected in the tracking data is a corresponding position that corresponds to the reference position. Since the position recognized as the curve may differ depending on the size of the curve, the curve position in the drawing data and the curve position in the tracking data are determined using the same determination reference (i.e., a vertex position, a start point, an end point, etc.).

As shown in FIG. 8, due to the effect of the vibration and the like described above, the tracking data may be acquired with the direction, the angle of the curve, the length of the straight line, etc. different from those in the drawing data. Thus, in this embodiment, the curve positions in the drawing data and the curve positions in the tracking data are superimposed onto each other and linear interpolation, for example, is applied for the straight line between the curves to correct the tracking data.

Specifically, first, the start point t0 is superimposed onto the start point d0, and then the respective curve positions are superimposed onto one another. For example, t1 which is a first curve position in the tracking data is superimposed onto d1 which is a corresponding first curve position in the drawing data. After that, the superimposition for the respective curve positions is performed similarly until the end points. This superimposition is performed to match the tracking data to the drawing data. Then, the linear interpolation is applied for the straight line portion between the superimposed curve positions in the tracking data. In this way, the tracking data is corrected.

Figure 9:
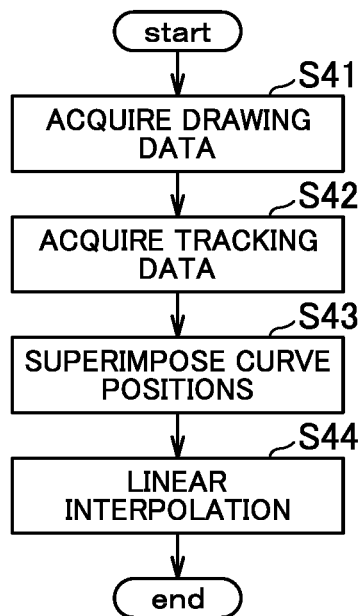
FIG. 9 is a flowchart of a correction process in the computer shown in FIG. 7.

The above-described correction process is outlined in the flowchart of FIG. 9. First, the communication unit 71 acquires the drawing data and the tracking data (steps S41, S42). Herein, step S41 and step S42 may be executed in the reversed order. Then, the processing unit 72 performs the processing of superimposing the curve positions (step S43) and further performs the linear interpolation (step S44).

As is apparent from the above description, the communication unit 71 functions as a first acquiring unit that acquires the drawing data in which the plurality of reference positions is set on the transportation path constituted of the transportation device, and functions as a second acquiring unit that acquires the measured data including the shape of the transportation path obtained during the transportation on the transportation path. Further, the processing unit 72 functions as a detecting unit that detects corresponding positions in the measured data that correspond to the reference positions, and functions as a correcting unit that superimposes the reference positions in the drawing data and the corresponding positions in the measured data corresponding to the reference positions onto each other to correct the path, in the measured data, between the reference positions.

Figure 10:
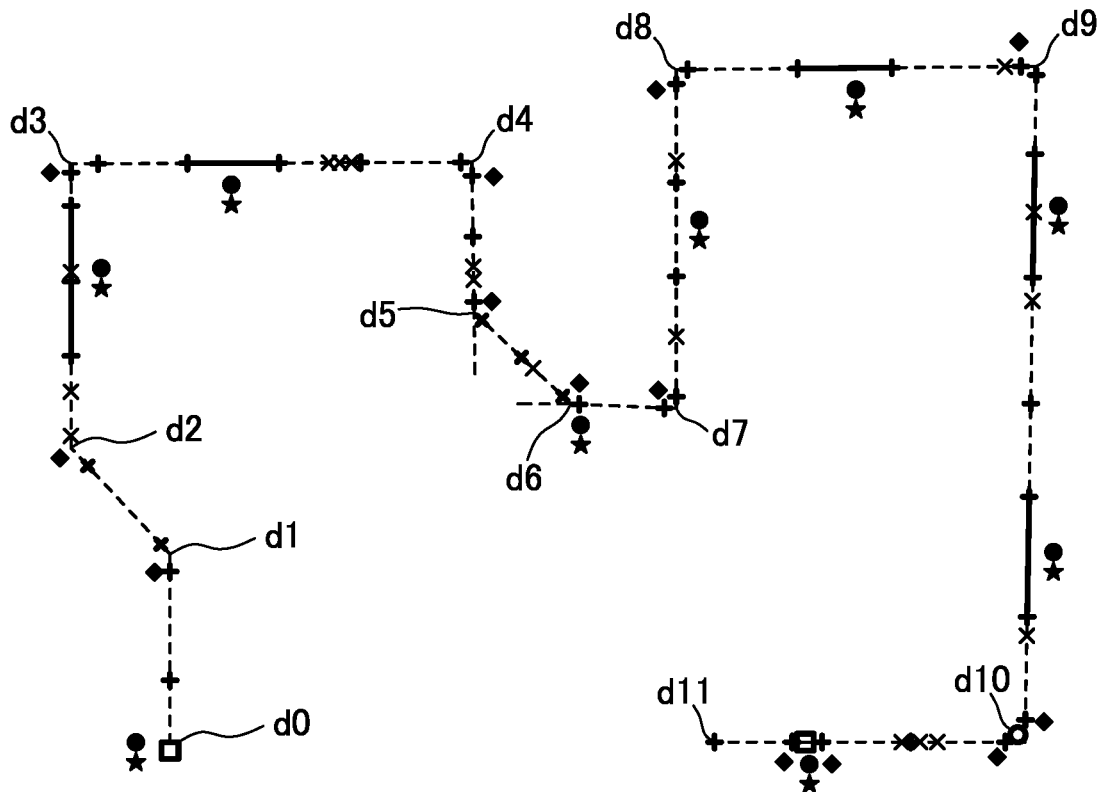
FIG. 10 illustrates a map showing a transportation path based on the drawing data on which abnormal locations based on tracking data after the correction process is executed is displayed.

FIG. 10 shows a map in which the abnormal locations based on the tracking data after the execution of the above-described correction process are displayed on the transportation path based on the drawing data. In FIG. 10, the dotted line indicates the roller conveyor, the solid line indicates the belt conveyor, the mark "+" indicates a position of a coupling portion, the mark "□" indicates a position of a lift, the mark "◇" indicates a position of an object detecting sensor, the mark "o" indicates a position of an inspection port, and the star mark "☆" indicates a position of an emergency-stop switch. Further, the mark "x" indicates the abnormal location. The color of the abnormal location may be changed according to the type of abnormality such as temperature abnormality, vibration abnormality, noise abnormality, etc.

The dotted line, the solid line, the marks "+", "□", "◇", "o" and the star mark "☆" described above are information about the facility and may be registered in advance in the drawing data. For the mark "x", these are acquired from the tracking data (i.e., the data acquired from the container 1) and applied with the position correction by the above-described correction processing. FIG. 10 is based on the drawing data thus it has high accuracy regarding the transportation path. Further, since the abnormal location has also been corrected in a manner as described above, the position where the abnormality is occurring is displayed with higher accuracy.

Figure 12:
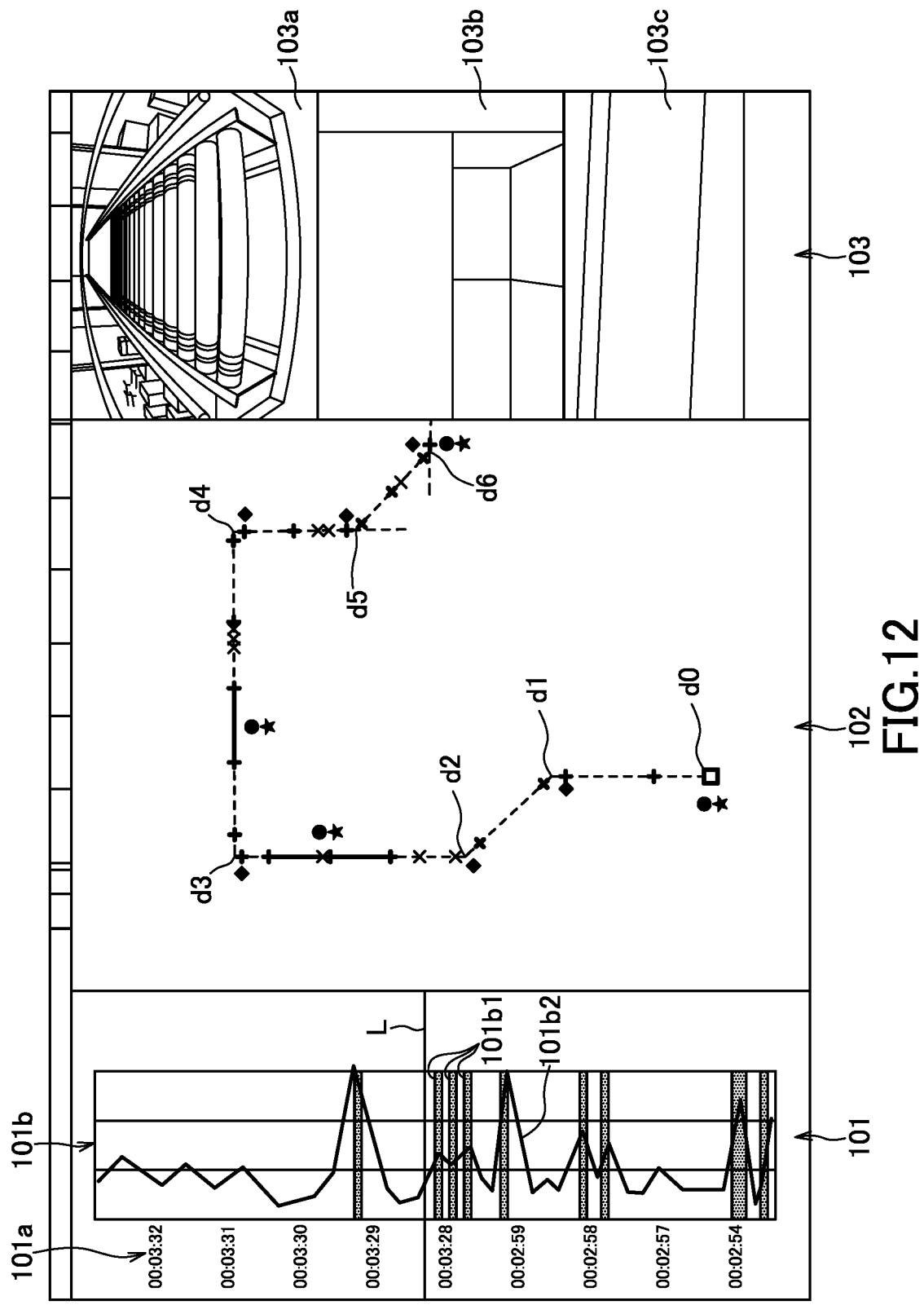
FIG. 12 illustrates a display example of the information display device according to one embodiment of the present invention.

The map shown in FIG. 10 may be displayed alone in the terminal device or the like, or alternatively, it may be displayed together with other information so it is easier to determine the cause of the abnormality. FIG. 12 shows a display example in the information display device according to this embodiment. In the following description, the information display device will be described as a device including a display with a touch panel (i.e., a tablet terminal, a smart phone, etc.), but it may alternatively be a monitor screen of a notebook-type computer or a desktop-type computer as well.

Figure 11:
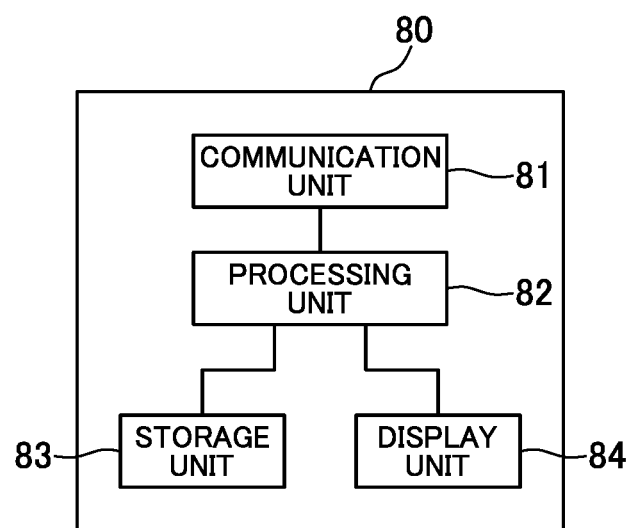
FIG. 11 is a diagram of a tablet terminal as an information display device according to one embodiment of the present invention.

FIG. 11 shows a functional configuration of a tablet terminal 80 as the information display device. The tablet terminal 80 includes a communication unit 81, a processing unit 82, a storage unit 83 and a display unit 84. The communication unit 81 performs wireless communication via a communication technology such as Wi-Fi (registered trademark). The communication unit 81 receives data such as data corrected by the computer 70, the abnormality information collected by the container 1 and information of an image captured by the camera 2. The abnormality information includes the abnormal location and details of the abnormality (i.e., noise abnormality, temperature abnormality, vibration abnormality, etc.). The data collected by the container 1 may be received via the computer 70 or may be received directly. Further, data may be acquired not only via the wireless communication but also via a wired connection using USB, LAN, etc., or may be acquired via a storage medium such as a memory card.

The processing unit 82 is constituted of a microprocessor, etc., and is configured to manage the overall control of the tablet terminal 80 described above. The storage unit 83 is constituted of, for example, a storage device such as an SSD, and is configured to store various data received by the communication unit 81. The display unit 84 includes, for example, a liquid crystal display with a touch panel, and performs various display and switching of display as described later, and the like.

FIG. 12 is a display example of the display unit such as a display of the information display device. In the display example of FIG. 12, a display area includes, in order from the left, a timeline 101, a map area 102 and a video area 103.

The timeline 101 is a diagram showing, in time series (i.e., change over time), a status of detection of the abnormality when the container 1 travels on the transportation path. The timeline 101 includes a time display part 101a and an information display part 101b. The time display part 101a shows a traveling time from the start point (in FIG. 12, time advances from bottom to top). An abnormal part 101b1 and an absolute movement amount 101b2 are displayed in the information display part 101b. The abnormal part 101b1 and the absolute movement amount 101b2 are displayed in an overlapping manner.

The abnormal part 101b1 indicates time at which the abnormality is detected, and it corresponds to the abnormal location described above. Preferably, the abnormal part 101b1 is displayed in red, for example, for the abnormal location so it is easily distinguished.

The absolute movement amount 101b2 is calculated by the processing unit 82 based on the detected values of the acceleration sensor included in the tracking data. Specifically, the absolute movement amount 101b2 is a value calculated by adding absolute values of the acceleration for the respective axes (x, y, z) of the 3-axis acceleration sensor. The absolute movement amount thus calculated can indicate the magnitude of vibration applied to the container 1. In other words, it can be said that large vibration is applied to a location where the absolute movement amount is large.

That is, in the tablet terminal 80, the communication unit 81 functions as an acceleration acquiring unit that acquires acceleration information at the time of the transportation of the transportation path constituted of the conveyor device 50, the processing unit 82 functions as a calculating unit that calculates an absolute movement amount indicative of the magnitude of vibration on the transportation path based on the acceleration information and functions as an absolute movement amount acquiring unit, and the display unit 84 displays the absolute movement amount.

The absolute movement amount may be calculated for each sampling period of the sensor, or may be calculated collectively for a plurality of sampling periods. For example, when the sampling period is 1000 Hz, it means the calculation is performed every 1 millisecond; but for example, the calculation may be performed every 100 samples (i.e., 0.1 seconds). For example, the amounts for 100 samples may be added up, or one in every 100 samples may be used for display. Alternatively, it may be an average value for 100 samples.

Further, the absolute movement amount is preferably calculated by adding the absolute values of the acceleration for the respective axes (x, y, z) of the 3-axis acceleration sensor, but when the acceleration sensor used is 2-axes or 1-axis acceleration sensor, it may be a value obtained by adding absolute values of the acceleration for two axes, or may be an absolute value of the acceleration for one axis. Further, when there is a plurality of acceleration sensors, it may be obtained by adding the detected values of all acceleration sensors, or it may be an average value.

Figure 13:
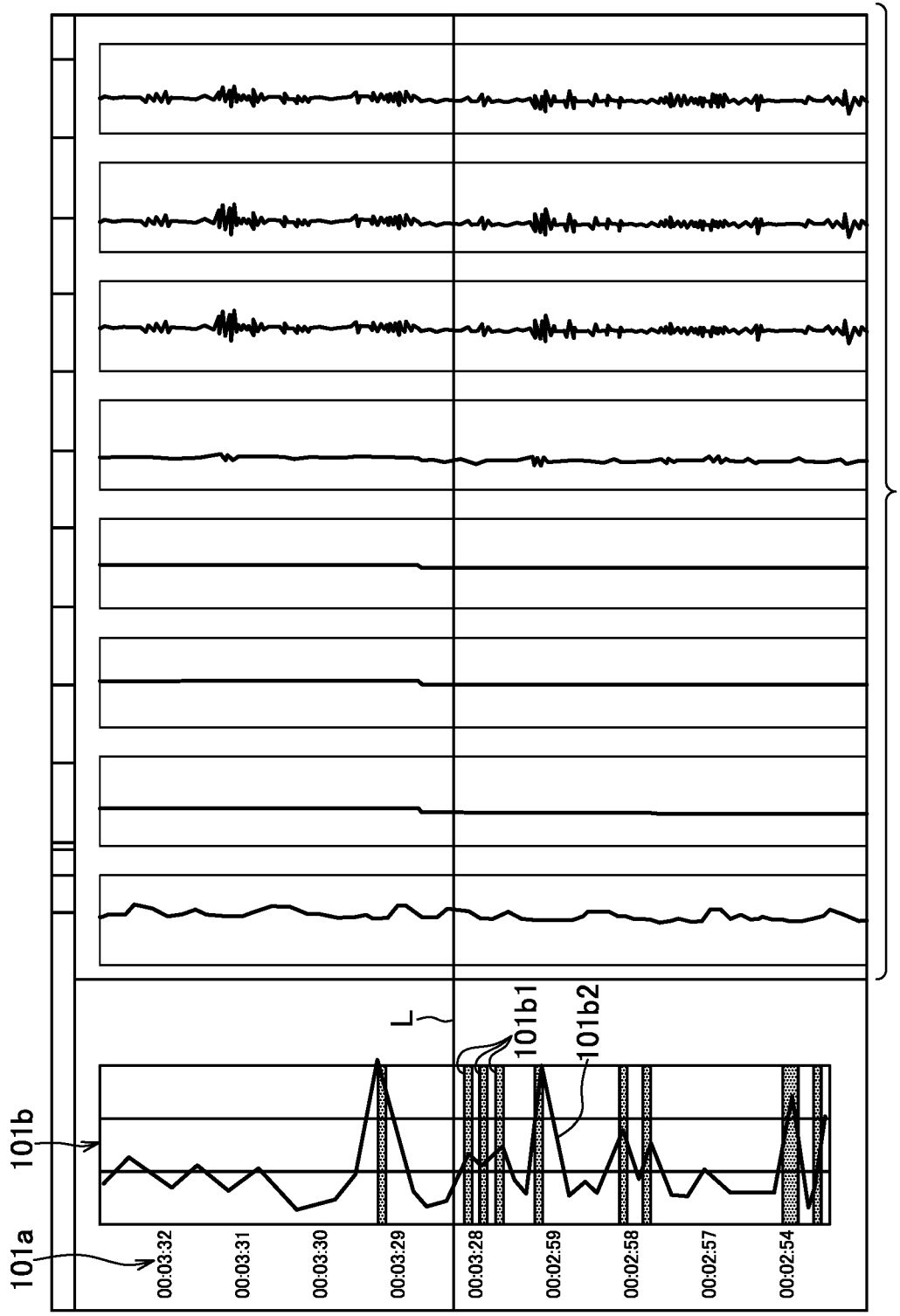
FIG. 13 illustrates the display example of FIG. 12 in which a timeline is slid to the right.

The timeline 101 may be configured to display acceleration data 101c of each axis by sliding its area to the right, as shown in FIG. 13. In addition to the acceleration, data (e.g., sounds) acquired by the sensor modules 4R, 4L, and/or temperature determined from the images captured by the cameras 2a, 2c which are thermal cameras may be displayed. In a state where the acceleration data of each axis is displayed, sliding the data to the left causes to return to the state shown in FIG. 12.

Figure 14:
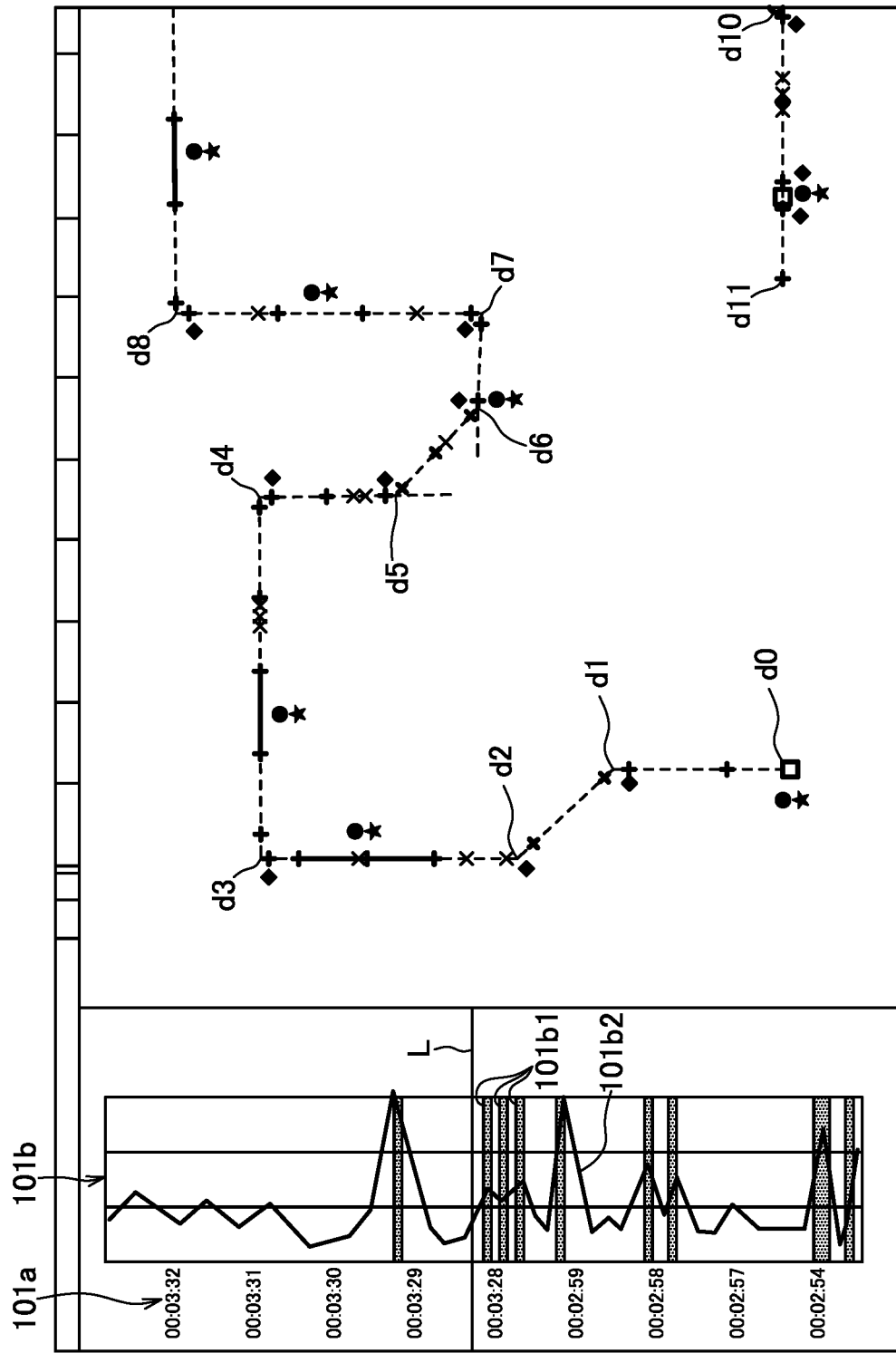
FIG. 14 illustrates the display example of FIG. 12 in which a map area is slid to the right.

In the map area 102, the map shown in FIG. 10 is displayed. For the map area 102, an enlarged map can be displayed by sliding its area to the right, as shown in FIG. 14. Herein, although the timeline 101 remains displayed in FIG. 14, it is alternatively possible to display the map on the entire screen. In a state where the enlarged map is displayed, sliding the map to the left causes to return to the state shown in FIG. 12.

In the video area 103, the images captured by the camera 2 (i.e., captured image information) are displayed. In FIG. 12, the video area 103 can display three images. Thus, the images from the camera 2b, the camera 2d and the camera 2e, for example, may be displayed at the same time. In FIG. 12, a video 103a is an image from the camera 2b, a video 103b is an image from the camera 2d, and a video 103c is an image from the camera 2e.

Further, for the image displayed in the video area 103, its time is displayed on the timeline 101. In FIG. 12, images at the time corresponding to a position of a line indicated by a reference sign L on the timeline 101 are displayed in the video area 103.

Figure 15:
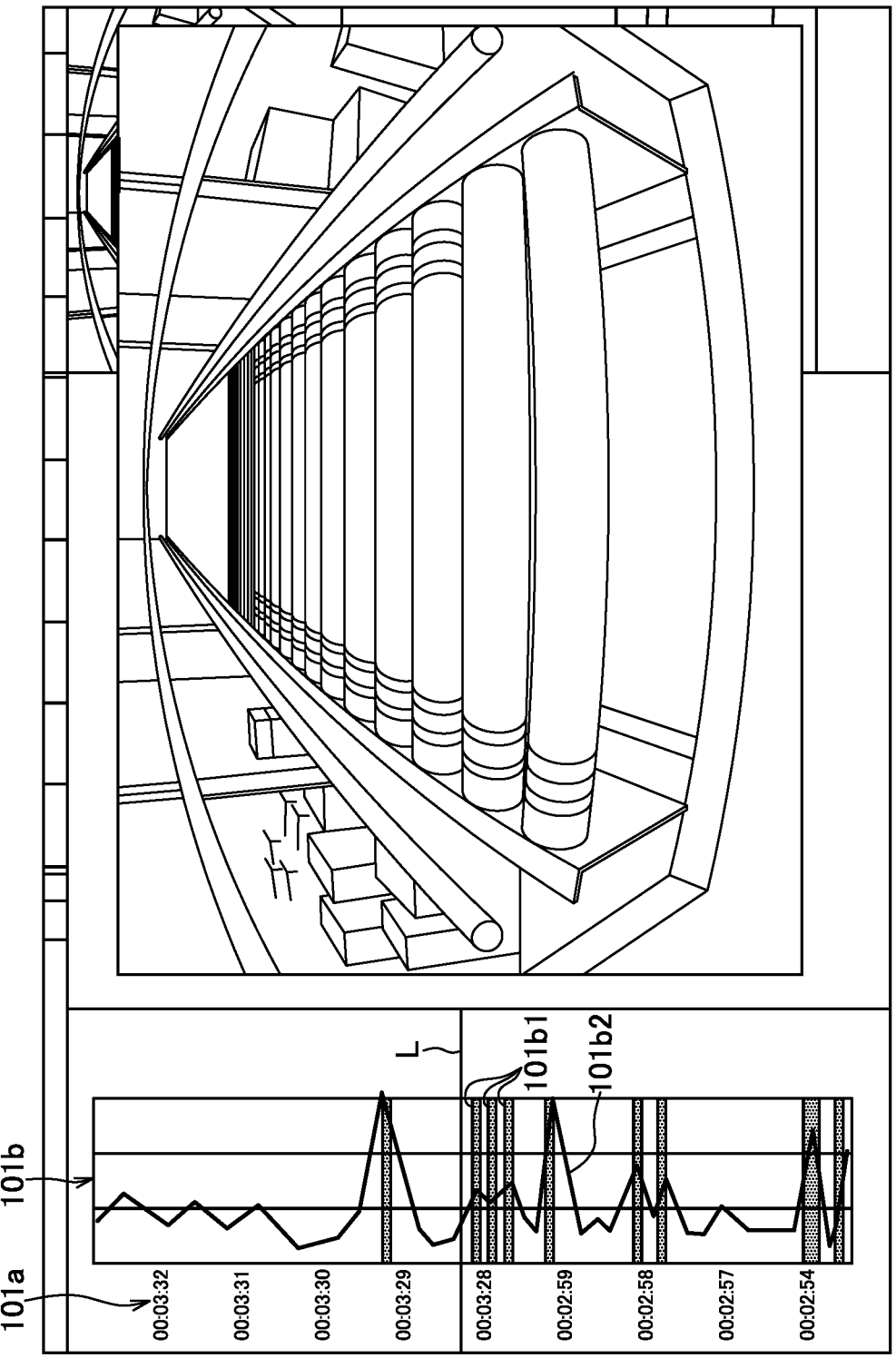
FIG. 15 illustrates the display example of FIG. 12 in which a video area is slid to the left.

For the video area 103, an enlarged display for any one of the images can be provided by sliding the area thereof to the left, as shown in FIG. 15. Herein, although the timeline 101 remains displayed in FIG. 15, it is alternatively possible to display the images on the entire screen. In a state where the enlarged images are displayed, sliding the images to the right causes to return to the state shown in FIG. 12.

The display example shown in FIG. 12 may be a modified example as shown in FIG. 16, for example. As in the case with the example shown in FIG. 12, the modified example shown in FIG. 16 includes a display area including, in order from the left, the timeline 101, the map area 102 and the video area 103.

As in the case with the example shown in FIG. 12, the timeline 101 includes the time display part 101a and the information display part 101b. The abnormal part 101b1 and the absolute movement amount 101b2 are displayed in the information display part 101b. The abnormal part 101b1 and the absolute movement amount 101b2 are displayed in an overlapping manner.

In FIG. 16, the abnormal part 101b1 is displayed for each of the left and right cameras 2a, 2c which are thermal cameras. In FIG. 16, the abnormal part 101b1 indicating temperature abnormality detected by the left camera 2a is displayed in an area indicated by the reference sign 101c1, and the abnormal part 101b1 indicating temperature abnormality detected by the right camera 2c is displayed in an area indicated by the reference sign 101c2. This allows to display on which side the abnormality is detected, thus the abnormal location can be determined easier.

In addition, jump buttons 101d1, 101d2 are added to the timeline 101 in FIG. 16. The jump buttons 101d1, 101d2 allow the position of the line L to jump (i.e., transit) to the next abnormal part 101b1. The jump button 101d1 allows to jump to the next abnormal part 101b1 in the upward direction in the drawing, and the jump button 101d2 allows to jump to the next abnormal part 101b1 in the downward direction in the drawing.

Further, scroll buttons 101e1, 101e2 are added to the timeline 101 in FIG. 16. The scroll buttons 101e1, 101e2 allow to scroll the timeline 101 in the time-axis direction (i.e., in the up-down direction). The scroll button 101e1 allows to scroll in the upward direction in the drawing, and the scroll button 101e2 allows to scroll in the downward direction in the drawing.

Further, a temperature display part 101f and a total number of abnormalities 101g are added to the timeline 101 in FIG. 16. The temperature display part 101f indicates a temperature value detected by the camera 2a, 2c and is displayed corresponding to each abnormal part 101b1. The total number of abnormalities 101g indicates a total number of the abnormal parts 101b1 detected by the camera 2a and a total number of the abnormal parts 101b1 detected by the camera 2c, respectively.

The map area 102 in FIG. 16 is basically the same as that of FIG. 12, except that a value regarding the abnormality is displayed next to the abnormal location indicated by the "x" mark. When it is displayed as "L52" as shown in FIG. 16, it indicates that it is the abnormality detected by the left camera 2a and that the detected temperature was 52° C. The value of the abnormality need not be displayed for all abnormal locations indicated by the "x" marks, and, for example, it may be displayed for one selected location. In the case where it is displayed for one selected place, the abnormal location at which the value is displayed is preferably indicated with the "x" mark that is larger and thicker than other "x" marks (alternatively, a display color thereof may be changed).

Further, in the map area 102 in FIG. 16, a part corresponding to the line L of the timeline 101 is displayed as a preview point P. In this way, it is possible to check by linking the position with time. Of course, when the line L is moved, the preview point P may also be moved. Alternatively, the preview point P may always be displayed at the center of the map area 102. Further, the preview point P may be linked to the time of the image being displayed in the video area 103 (that is, the image captured at the preview point P may be displayed in the video area 103).

The video area 103 in FIG. 16 is basically the same as that in FIG. 12. Unlike FIG. 12, the video 103b in FIG. 16 may display the image from the camera 2a, and the video 103c may display the image from the camera 2c.

According to the embodiment described above, the computer 70 is configured such that the communication unit 71 acquires the drawing data in which a plurality of curve positions is set on the transportation path constituted of the conveyor device 50, and the tracking data which includes the shape of this transportation path obtained from the transportation on the transportation path. Then, the processing unit 72 detects the curve positions in the tracking data, superimposes the curve positions in the drawing data and the curve positions in the tracking data corresponding to those curve positions onto each other, and corrects the path between the curve positions in the tracking data.

Thus, the curve positions in the drawing data and the curve positions in the tracking data corresponding to those curve positions in the drawing data are superimposed onto each other, and the path between the curve positions in the tracking data is corrected, it is possible to make the correction even when there is a deviation between the drawing data which is the actual layout and the tracking data, thereby improving accuracy of determination of the abnormal location.

Further, since the curve position is used as a reference position, it is easy to set the reference position. Further, since the path between the reference positions is linear, it is possible to perform the linear interpolation, thereby facilitating the correction processing.

Further, since the tracking data is obtained by transporting, on the transportation path, the container 1 including the cameras 2a, 2c and the sensor modules 4L, 4R which detect a condition of the conveyor device 50, the tracking data can be automatically acquired by transporting the container 1.

Further, the tablet terminal 80 is configured such that the communication unit 81 acquires the acceleration information during the transportation of the transportation path constituted of the conveyor device 50, and that the processing unit 82 calculates the absolute movement amount based on the acceleration information. Then, the display unit 84 displays the absolute movement amount. By doing so, the location where the absolute movement amount is large can be determined to be the location where the vibration is large and serious failure is possibly occurring, allowing to give this location a priority in checking.

Further, the acceleration information is the acceleration information for the three axes, and the calculating unit calculates the absolute movement amount by adding the absolute values of the respective accelerations for the three axes. Consequently, the vibration applied to the container 1 from each of the up-down direction, the front-rear direction and the left-right direction can be reflected in the absolute movement amount, thereby enabling to detect the abnormal location more accurately.

Further, since the display unit 84 displays the absolute movement amount as a change over time, it is possible to identify the time when the large vibration is applied, thus the abnormal location can be determined quickly.

Further, the tablet terminal 80 acquires abnormality occurrence information which is information about the abnormality occurring location on the transportation path, and the display unit 84 displays the abnormality occurrence information and the absolute movement amount in an overlapping manner. Consequently, it is possible to indicate the relationship between the abnormality occurring location and the location where the vibration is large. Moreover, it is also possible to easily separate the abnormality related to the vibration from the abnormality related to causes other than the vibration.

Further, the abnormality occurrence information also includes the captured image information obtained by capturing the image on the transportation path by the camera, and the display unit 84 displays the timeline 101 in which the abnormality occurrence information and the absolute movement amount are displayed in an overlapping manner, the map area 102 in which the layout of the transportation path is displayed, and the video area 103 in which the captured image information is displayed. By doing so, it is possible to display three types of information at the same time. Moreover, the timeline, the map and the captured image information can be displayed in a linked manner, thereby facilitating the search for the cause of the abnormality and such.

In the information display device described above, the correction processing performed by the computer 70 is not essential as long as the information display device can acquire data that enables the display as shown in FIG. 12, etc. Further, in the information display device, the calculation of the absolute movement amount is also not essential, and the information display device may be configured to acquire the results calculated by an external device. In other words, the information display device may be at least configured to acquire the absolute movement amount and the abnormality information and display them in an overlapping manner.

Further, the timeline 101 may be displayed in terms of distance rather than time. In this case, the distance from the start point of the path to the abnormal location becomes clear.

The present invention is not limited to the embodiments described above. That is, those skilled in the art can variously modify and implement the embodiments in accordance with conventionally known knowledges without departing from the gist of the present invention. Those modifications are of course within the scope of the present invention as long as they include the configuration of the information processing device and/or the information display device of the present invention.

LIST OF REFERENCE SIGNS

1 container (object to be transported)
2a camera (condition detecting unit)
2b camera
2c camera (condition detecting unit)
2d camera
2e camera
3 controller
4L sensor module (condition detecting unit)
4R sensor module (condition detecting unit)
50 transportation device
70 computer (information processing device)
71 communication unit (first acquiring unit, second acquiring unit)
72 processing unit (detecting unit, correcting unit)
80 tablet terminal (information display device)
81 communication unit (acquiring unit)
82 processing unit (calculating unit)
84 display unit
101 timeline (timeline part)
102 map area (map part)
103 video area (video part)

What is claimed is:

1. An information processing device comprising:
a first acquiring unit configured to acquire drawing data in which a plurality of reference positions is set on a transportation path constituted of a transportation device;
a second acquiring unit configured to acquire measured data obtained as a result of transportation on the transportation path, the measured data including a shape of the transportation path;
a detecting unit configured to detect corresponding positions in the measured data that correspond to the reference positions; and
a correcting unit configured to superimpose the reference positions in the drawing data and the corresponding positions onto each other, and correct a path, in the measured data, between the reference positions,
wherein the reference position is a curve position on the transportation path.

2. The information processing device according to claim 1, wherein the measured data is obtained by the transportation of an object to be transported on the transportation path, the object to be transported including a condition detecting unit that detects a condition of the transportation device.

* * * * *